Aug. 1, 1950     C. D. PAUL     2,517,231
SPINDLE AND BEARING ASSEMBLY
Filed Sept. 5, 1946
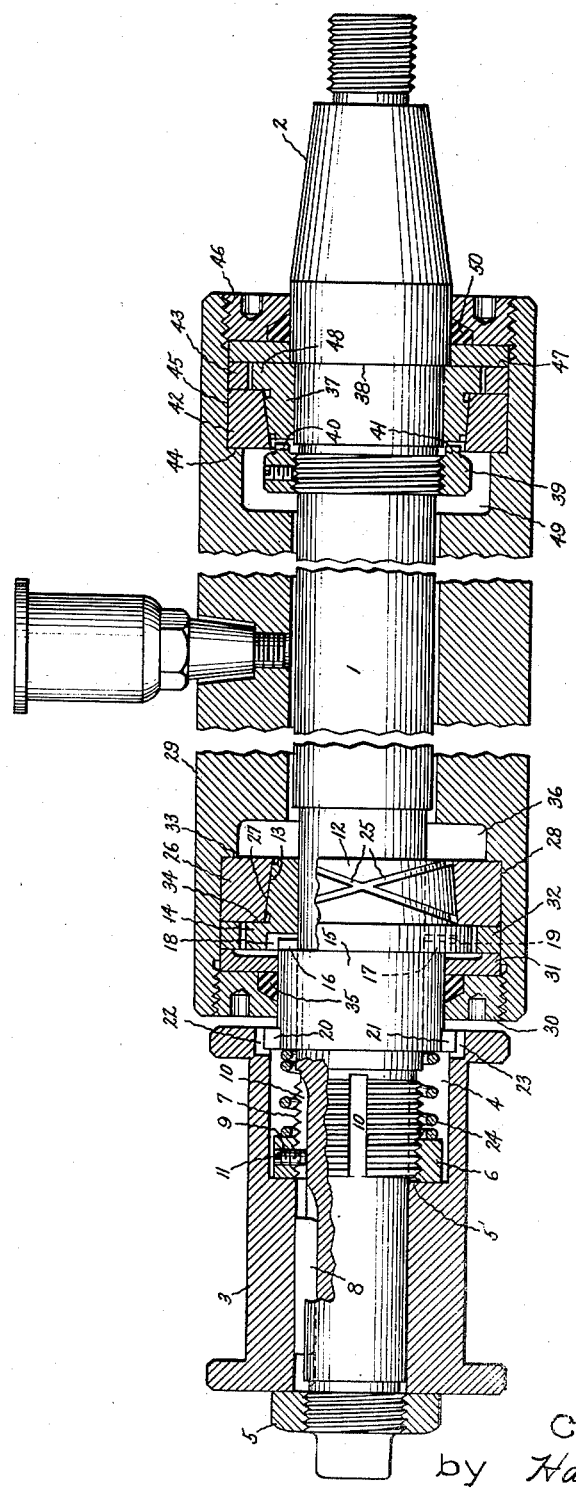
Inventor:
Christ D. Paul,
by Harry E. Dunham
His Attorney.

Patented Aug. 1, 1950

2,517,231

UNITED STATES PATENT OFFICE 2,517,231

SPINDLE AND BEARING ASSEMBLY

Christ D. Paul, Detroit, Mich., assignor to Carboloy Company, Inc., a corporation of New York Application September 5, 1946, Serial No. 694,929

7 Claims. (Cl. 308—70)

The present invention is an improved spindle and bearing assembly having cemented carbide bearings and which is particularly adapted for use in grinding machines and the like. One of the objects of the invention is the provision of a spindle and bearing assembly in which proper radial clearance and end play can be easily maintained. Further objects of the invention are the provision of spindle and bearing assemblies which have identical characteristics and the provision of a spindle and bearing assembly in which all bearing parts may be machined easily. Another object of the invention is the provision of means whereby the assembly and disassembly of the spindle and bearing parts may be accomplished quickly and easily. Other objects will appear hereinafter.

The novel features which are characteristic of my invention are set forth with particularity in the appended claims. My invention itself, however, will best be understood by reference to the following specification when considered in connection with the accompanying drawing in which the single figure is a view broken away and partly in longitudinal cross section and partly in elevation of a spindle and bearing assembly which embodies the features of the present invention.

Referring more particularly to the drawing, I have indicated at 1 a spindle or shaft having a tapered end portion 2 on which a grinding wheel or other driven device, not shown, may be secured. On the opposite end of shaft 1 a flanged driving pulley 3 having a recess 4 at its inner end is rigidly mounted between a nut 5 and a shoulder 5' on shaft 1. Pulley 3 is connected to shaft 1 for rotation therewith by means of a key 8. A spanner nut 6 is mounted on a screw threaded portion 7 of shaft 1 and provided with a tapped hole 9 extending therethrough. The screw threaded portion 7 is provided with four equally spaced, parallel, longitudinal grooves 10. A set screw 11 in the tapped hole 9 is adapted to engage any one of grooves 10 and thereby lock nut 6 at any desired point on the screw-threaded portion 7 of shaft 1, and thus control the tension of spring 24.

Shaft 1 is provided with substantially identical bearings at points adjacent its opposite ends. The bearing adjacent driving pulley 3 comprises a cemented carbide ring 12 having an outer tapered bearing surface 13 and an integral outwardly extending flange 14. A clearance of about 0.0003" to 0.0004" between shaft 1 and the bearing hole in ring 12 permits relative longitudinal movement between shaft 1 and bearing member 12 notwithstanding radial expansion of the shaft due to increase in its temperature during operation.

The bearing member 12 is connected to pulley 3 and shaft 1 for rotary movement therewith by means of a metal sleeve or torque bushing 15. The latter is slidably mounted on shaft 1 and provided at its inner end with two diametrically opposite keys 16 and 17 engaging two cooperating keyway slots 18 and 19 in the bearing ring 12. The opposite end of bushing 15 is provided with two projections 20 and 21 which engage cooperating slots 22 and 23 on the adjacent end of the driving pulley 3. The coil spring 24 surrounds shaft 1 between bushing 15 and the adjustable nut 6. When the nut 6 is adjusted to compress spring 24 the bushing 15 is moved along shaft 1 and pressed into contact with the bearing member 12 to thereby move the member 12 into desired contact with an outer stationary cemented carbide bearing member 26. At the same time the pressure of the spring 24 against the nut 6 serves to move shaft 1 in the opposite direction. A clearance of about 1/16" between the ends of the projections 20 and 21 and the opposite surfaces of the slots 22 and 23 and a clearance of about 0.0002" to 0.0003" between the torque bushing 15 and shaft 1 permit the bushing 15 to slide to a limited extent in opposite directions on shaft 1. The outer surface of the inner bearing ring 12 is tapered and provided with circumferential, intersecting, oil grooves 25.

The outer stationary bearing member 26 has a smooth inner tapered surface 27 which cooperates with the correspondingly tapered surface 13 on the bearing ring 12. During operation there is a clearance of about 0.0003" between the tapered surfaces. This clearance may be varied to meet different conditions.

The stationary bearing member 26 is positioned in the recessed portion 28 of a shaft and bearing housing 29 and held against movement therein by a nut 30 mounted in the recess and adapted to exert pressure on bearing member 26 by means of a flanged washer 31 the outer rim of which bears against a metal ring 32 positioned between the washer 31 and bearing member 26. Inward movement of nut 30 in the housing 29 locks the outer bearing member 26 between the ring 32 and an annular ledge or shoulder 33 in the recess 28. A portion 34 of the opposite vertical surface of the outer bearing member 26 adjacent ring 32 is adapted to contact the flat surface of the outwardly extending flange 14 on the inner bearing member 12 and prevents any binding action between the cooperating tapered surfaces of the bearing members 12 and 26. A clearance of about 0.001" to 0.002" permits sliding movement of torque bushing 15 within the nut 30 and washer 31. A clearance of 1/32" between the inner surface of the stationary ring 32 and the outer adjacent surface of the flange 14 permits sliding movement of the inner bearing member 12 within ring 32 and also serves as an oil reservoir. The recessed end 28 of the housing 29 is provided with an oil pocket 36 while a fabric or other suitable washer 35 provides an oil seal between the nut 30 and bushing 15.

The opposite end of the housing 29 and the bearing assembly adjacent the driven end of shaft 1 are substantially identical in structure with the end of the housing and bearing assembly adjacent the driving pulley 3. At the driven end of the shaft a flanged cemented carbide bearing member 37 is mounted on shaft 1 between a circular ledge or shoulder 38 thereon and a spanner nut 39. The outer surface of the bearing 37 is tapered and provided with intersecting oil grooves similar to those on the bearing member 12. The nut 39 is threaded onto shaft 1 and provided with a pair of diametrically opposite integral extensions or splines 40 and 41 which contact the bearing member 37 through cooperating grooves or slots therein. A stationary cemented carbide outer bearing member 42 is mounted on the inner bearing member 37 and held in position between a ring 43 and a circular ledge or shoulder 44 in the recess 45 of housing 29. A nut 46 engages a screw threaded portion of recess 45 and forces a washer 47 against the ring 43 to thereby lock the outer cemented carbide bearing member 42 in position in recess 45. Inward movement of the nut 46 also causes the washer 47 to move to the desired end play position. The difference in width between flange 48 and ring 43 is the amount of permitted end play. The recess 45 is provided with an oil pocket 49.

A small clearance between bearing member 37 and shaft 1, for example about 0.0003", permits radial expansion of shaft 1 and prevents injury of the member 37 which might occur if gripping action occurred between shaft 1 and the bearing member. A like clearance is provided between the cooperating tapered surfaces of the bearing members 37 and 42. A clearance of 1/32" also is provided between the outer surface of flange 48 on bearing member 37 and the inner surface of ring 43 while a clearance of .0005–.001" is provided between flange 48 and bearing member 42 and washer 47. A clearance of about 0.001–0.002" between shaft 1 and inner surfaces of the washer 47 and the nut 46 permits rotation and slight lateral movement of shaft 1 within those members. A fabric washer 50 provides an oil seal between shaft 1 and the nut 46.

In operation, pulley 3 drives shaft 1, torque bushing 15, nuts 5, 6 and 39, inner bearing rings 12 and 37, key 8 and spring 24 as a unit while the outer bearing members 26 and 42, housing 29, nuts 30, 46, washers 31, 47, rings 32, 43 and oil seals 35 and 50 remain stationary. When the nut 6 is adjusted to compress spring 24, the torque bushing keys 16 and 17 in slots 18 and 19 move the flange 14 and tapered surface on the bearing member 12 into close contact with the cooperating bearing surface of the stationary bearing member 26. At the same time the spring pulls shaft 1 and inner bearing member 37 in the opposite direction so that the flange 48 and the tapered surface on bearing member 37 are pulled into close contact with cooperating surfaces on the stationary bearing member 42. The flat surface bearing action obtained at both ends of shaft 1 between the flange on the inner bearing member and the cooperating flat surface on the outer bearing member prevents any locking action between the cooperating tapered bearing surfaces and maintains a uniform and desired radial play between the tapered bearing surfaces. With the disclosed arrangement of the outer stationary bearing member 42, ring 43, washer 47 and nut 46, it is possible to obtain positive end play control which is particularly desirable in many grinding operations such as gage and form work and the like.

By mounting the inner bearing members 12 and 37 on shaft 1 with sufficient radial clearance between the shaft and bearing members, radial expansion of the steel shaft 1 is permissible while at the same time all danger of cracking the inner bearing members by shaft expansion is eliminated. Furthermore, both inner bearing members run true to each other at all times. During operation the radial clearance between the inner bearing members 12 and 37 and shaft 1 is taken up by the expansion of shaft 1 and a thin film of oil. Since no taper bearing locking friction exists in my improved spindle and bearing assembly, the spindle will always run far cooler than has heretofore been possible. The elimination of taper locking bearing friction as heretofore pointed out, is controlled by the flat cooperating contact surfaces, on the inner and outer bearing members.

With my improved arrangement of parts the cemented carbide bearing members may be reconditioned many times for radial or end play, at small cost, before any replacement is necessary. This may be accomplished in the following manner: For radial clearance take up, stock may be removed either from the inner flat surfaces on the inner bearing members or from the outer flat surfaces on the outer bearing members. For increasing radial clearance, stock may be removed from the tapered bearing surfaces of either the outer or inner bearing members. In order to take up for end play, the length of ring 43 may be decreased. Since the contact between the flat cooperating surfaces on the inner and outer bearing members at both ends of the shaft 1 are spring-controlled any radial play in the assembly will always be uniform in character.

Although all the bearing parts in my improved spindle and housing assembly are made of cemented carbide they are relatively easy to machine thereby providing low manufacturing cost. Also, due to the flat straight surfaces and the taper bearing surfaces on both outer and inner bearing members, precision bearing surfaces can be held with ease and with minimum scrap in attaining that end.

While I have illustrated my improved bearing assembly as positioned within a single housing it is obvious that the invention is not limited to the use of a single housing and that two housings may be employed if desired, one for each end of the spindle. Also, since all the cemented carbide bearing members may be standardized, and mold-pressed to form, machine finishing time is greatly reduced. The installation of new bearing members or the replacement of any parts in the assembly is a simple operation since no press fit parts are employed as in other spindle and bearing assemblies. In addition, the absence of press fitted parts in my assembly helps to keep the steel shaft 1 in good condition.

What I claim as new and desire to secure by Letters Patent of the United States, is:

1. In combination, a shaft, a bearing therefor comprising two ring shaped members each having cooperating tapered surfaces, one of said members being mounted within the other, the inner member being rotatable with said shaft but axially movable relative thereto and the outer member being stationary, said inner member having a flange with a planar bearing surface thereon substantially perpendicular to the longitudinal axis of said inner bearing member and adapted to contact a similar planar surface on said stationary member, and spring means for adjusting the contact of said planar surfaces to thereby limit movement of said inner member within said outer member.

2. In combination, a shaft, bearings therefor positioned adjacent opposite ends thereof, each of said bearings comprising a stationary member and an inner member rotatable with said shaft and positioned within said stationary bearing member, the outer surface of the inner bearing member and the inner surface of the stationary bearing member being correspondingly tapered, said inner bearing member having an outwardly extending flange having a planar surface substantially perpendicular to the longitudinal axis of said inner bearing member and adapted to contact a planar surface on, and substantially perpendicular to the longitudinal axis of, said stationary member and thereby limit movement of the inner member within said outer member, said stationary bearing members being positioned between the said planar faces of said inner bearing members, said shaft having a limited longitudinal play in said bearings, and resilient means acting between said shaft and inner bearing members for controlling said limited longitudinal play.

3. The combination claimed in claim 2 including an abutment on said shaft against which the outer face of one of the inner bearing members abuts, a bushing surrounding said shaft and engaging the outer face of the other inner bearing member, said bushing being positioned between said resilient means and said other inner bearing member whereby said resilient member acts to control the contact between said planar faces of each of said bearings.

4. The combination claimed in claim 2 wherein said inner and outer bearing members consist of cemented carbide.

5. The combination claimed in claim 4 wherein the shaft consists of steel and a limited radial clearance of a few ten thousandths of an inch is provided between said shaft and the inner bearing members to provide for radial expansion of said steel shaft at spindle running temperature.

6. In combination, a shaft, bearings therefor positioned adjacent opposite ends thereof, each of said bearings comprising a stationary member and an inner member rotatable with said shaft and positioned within said stationary bearing member, the outer surface of the inner bearing member and the inner surface of the stationary bearing member being correspondingly tapered, said inner bearing member having an outwardly extending flange having a planar surface substantially perpendicular to the longitudinal axis of said inner bearing member and adapted to contact a planar surface on, and substantially perpendicular to the longitudinal axis of, said stationary member and thereby limit movement of the inner member within said outer member, the said shaft being journalled in the inner members of said bearings, a driving connection between said shaft and each of said inner bearing members, one of said driving connections comprising a torque bushing surrounding said shaft and having a limited relative longitudinal movement thereon, a driving connection between said torque member and said inner bearing member, spring means acting between an abutment on said shaft and the outer end of said torque bushing whereby the spring acts between said torque bushing and abutment to control the sliding contact between said planar surfaces of each of said bearings.

7. The combination claimed in claim 6 including a pulley splined on said shaft, and a driving connection between said pulley and said torque bushing whereby driving torque for one of said inner bearing members is transmitted from said pulley through said torque bushing.

CHRIST D. PAUL.

REFERENCES CITED

The following references are of record in the file of this patent:

UNITED STATES PATENTS

| Number | Name | Date |
| --- | --- | --- |
| 470,497 | Loveland | Mar. 8, 1892 |
| 726,378 | Tucker | Apr. 28, 1903 |
| 1,448,157 | Selik | Mar. 13, 1923 |

FOREIGN PATENTS

| Number | Country | Date |
| --- | --- | --- |
| 13,915 | Denmark | Nov. 28, 1910 |
| 608,872 | France | Aug. 4, 1926 |
| 553,240 | Great Britain | May 13, 1943 |